(12) United States Patent
Shoji et al.

(10) Patent No.: US 11,613,441 B2
(45) Date of Patent: Mar. 28, 2023

(54) ELASTIC ROLLER

(71) Applicants: RISETEC CO., LTD., Kobe (JP); SANWA TECHNO CO., LTD., Kobe (JP)

(72) Inventors: Susumu Shoji, Kobe (JP); Kazuro Fukui, Kobe (JP)

(73) Assignee: RISETEC CO., LTD., Kobe (JP)

( * ) Notice: Subject to any disclaimer, the term of this patent is extended or adjusted under 35 U.S.C. 154(b) by 468 days.

(21) Appl. No.: 16/621,368

(22) PCT Filed: Apr. 15, 2019

(86) PCT No.: PCT/JP2019/016202
§ 371 (c)(1),
(2) Date: Dec. 11, 2019

(87) PCT Pub. No.: WO2019/203199
PCT Pub. Date: Oct. 24, 2019

(65) Prior Publication Data
US 2020/0165093 A1 May 28, 2020

(30) Foreign Application Priority Data

Apr. 18, 2018 (JP) .............................. JP2018-080267

(51) Int. Cl.
*B65H 27/00* (2006.01)
*B65H 3/06* (2006.01)
(Continued)

(52) U.S. Cl.
CPC .............. *B65H 27/00* (2013.01); *B65H 3/06* (2013.01); *B65H 3/0638* (2013.01); *B65H 5/06* (2013.01); *F16C 13/00* (2013.01); *B65H 2515/81* (2013.01)

(58) Field of Classification Search
CPC ...... B65H 29/125; B65H 51/08; B65H 51/10; B65H 2301/42262; B65H 2301/41369;
(Continued)

(56) References Cited

U.S. PATENT DOCUMENTS 4,305,191 A * 12/1981 Enomoto ................ B21B 27/05
492/6
4,803,877 A * 2/1989 Yano ...................... B65H 20/02
100/168
(Continued)

FOREIGN PATENT DOCUMENTS

JP 62-220711 A 9/1987
JP 4-75073 A 3/1992
(Continued)

OTHER PUBLICATIONS

International Search Report dated Jun. 11, 2019, issued in counterpart International Application No. PCT/JP2019/016202, with English Translation. (4 pages).
(Continued)

*Primary Examiner* — Jason L Vaughan
(74) *Attorney, Agent, or Firm* — WHDA, LLP

(57) ABSTRACT

An elastic roller is capable of elastic deformation at low load, lightweight and low-cost, and the surface speed of the roller has been made stable. At a drawing showing the view from the side of pipe 2 and flange 3 which make up roller 1, roller 1 which has pipe 2 and flange 3 is supported by shaft 8 which is inserted therein along axis 8a of shaft 8, the situation being such that elastic deformation occurs upon being pressed downward by pressure P from pressure-applying body 11 above pipe. None of the four outermost ribs 7a disposed in outermost gap 6a between outermost ring
(Continued)

4a of flange 3 and middle ring 4b which is mutually adjacent thereto and toward the interior therefrom is present in the upper portion of pipe 2.

7 Claims, 10 Drawing Sheets

(51) Int. Cl.
  *B65H 5/06* (2006.01)
  *F16C 13/00* (2006.01)
(58) Field of Classification Search
  CPC .......... B65H 2404/15; B65H 2404/147; B65H 2404/1526; B65H 2404/261
  See application file for complete search history.

(56) References Cited

U.S. PATENT DOCUMENTS

| | | | |
|---|---|---|---|
| 4,823,689 A * | 4/1989 | Kishino | G03G 21/0058 100/155 R |
| 2016/0229653 A1 | 8/2016 | Shoji et al. | |
| 2016/0238065 A1 * | 8/2016 | Otten | B41F 27/105 |
| 2017/0225916 A1 * | 8/2017 | Tsuda | B65H 3/5215 |
| 2018/0297797 A1 | 10/2018 | Maruyama et al. | |
| 2019/0062083 A1 * | 2/2019 | Maruyama | H04N 1/00519 |
| 2021/0180646 A1 * | 6/2021 | Chaumet | F16C 41/008 |

FOREIGN PATENT DOCUMENTS

| | | |
|---|---|---|
| JP | 6-75458 A | 3/1994 |
| JP | 9-26681 A | 1/1997 |
| JP | 9-171296 A | 6/1997 |
| JP | 2000-240638 A | 9/2000 |
| JP | 2001-42633 A | 2/2001 |
| JP | 2004-93948 A | 3/2004 |
| JP | 2006-75718 A | 3/2006 |
| JP | 2006-207790 A | 8/2006 |
| JP | 2007-147990 A | 6/2007 |
| JP | 2011-149461 A | 8/2011 |
| JP | 2011-232433 A | 11/2011 |
| JP | 2018-177461 A | 11/2018 |
| WO | 2015/049808 A1 | 4/2015 |

OTHER PUBLICATIONS

Written Opinion of the International Searching Authority (Form PCT/ISA/237) dated Jun. 11, 2019, issued in counterpart International Application No. PCT/JP2019/016202 (8 pages).

* cited by examiner

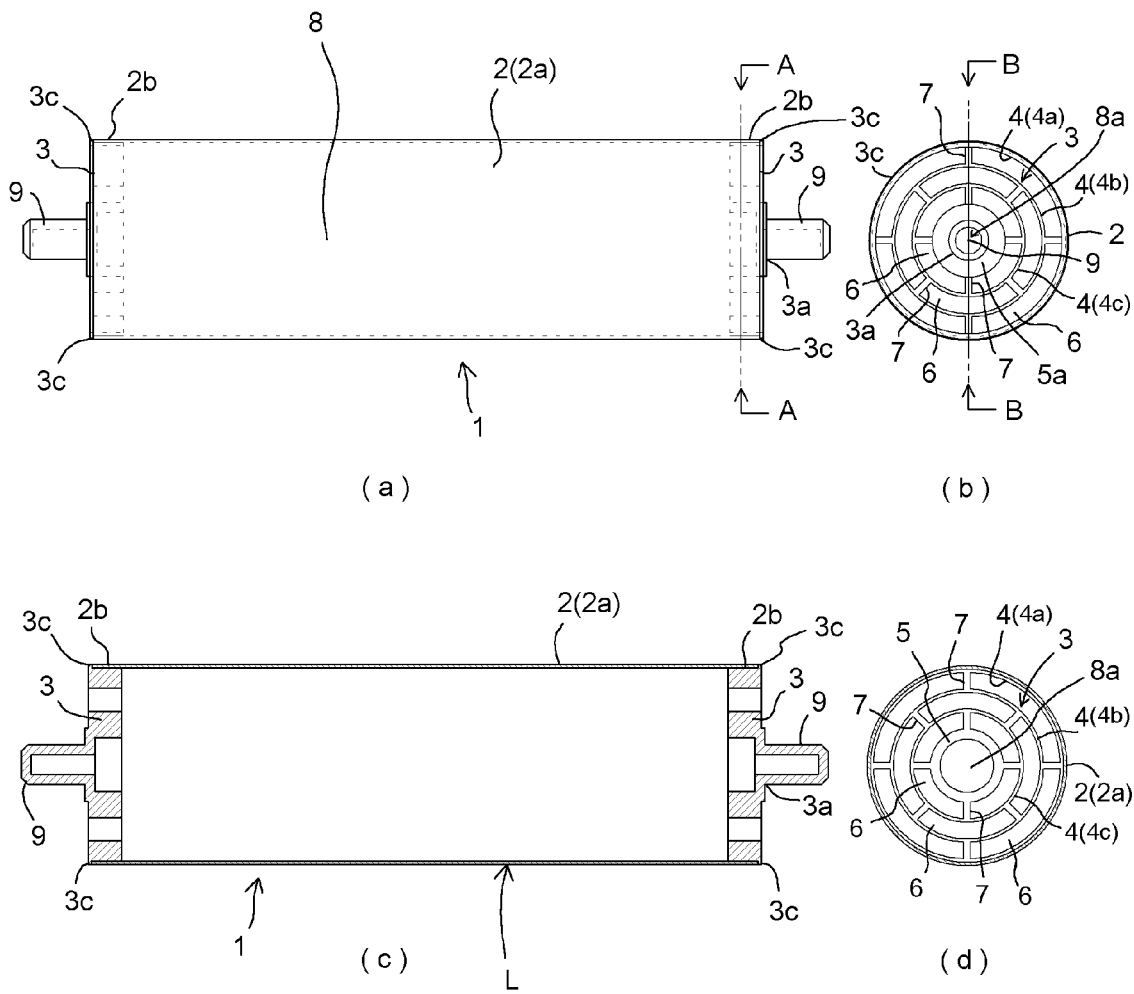
[FIG. 1]

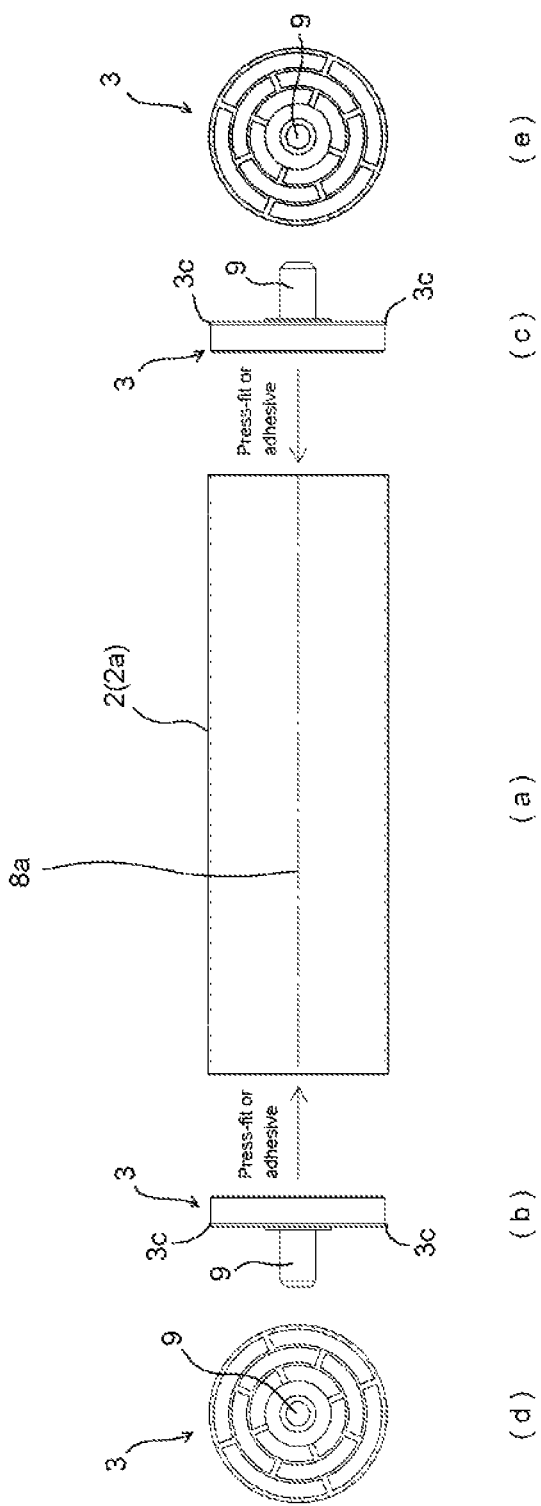

[FIG. 3]
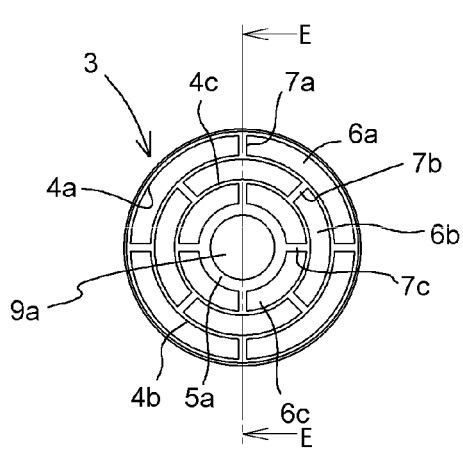
(a)
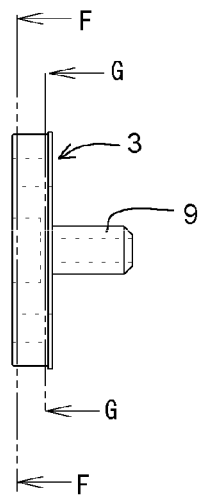
(b)
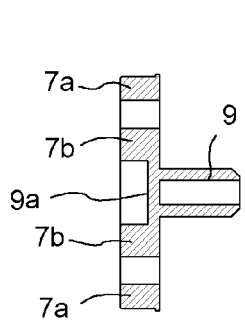
Section E-E
(c)
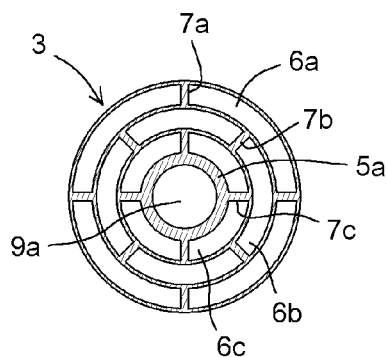
Section F-F
(d)
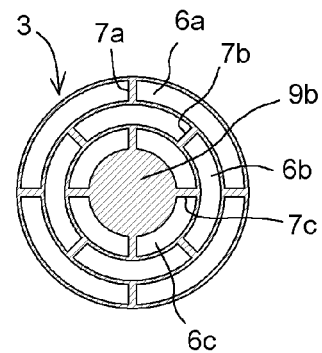
Section G-G
(e)

[FIG. 4]
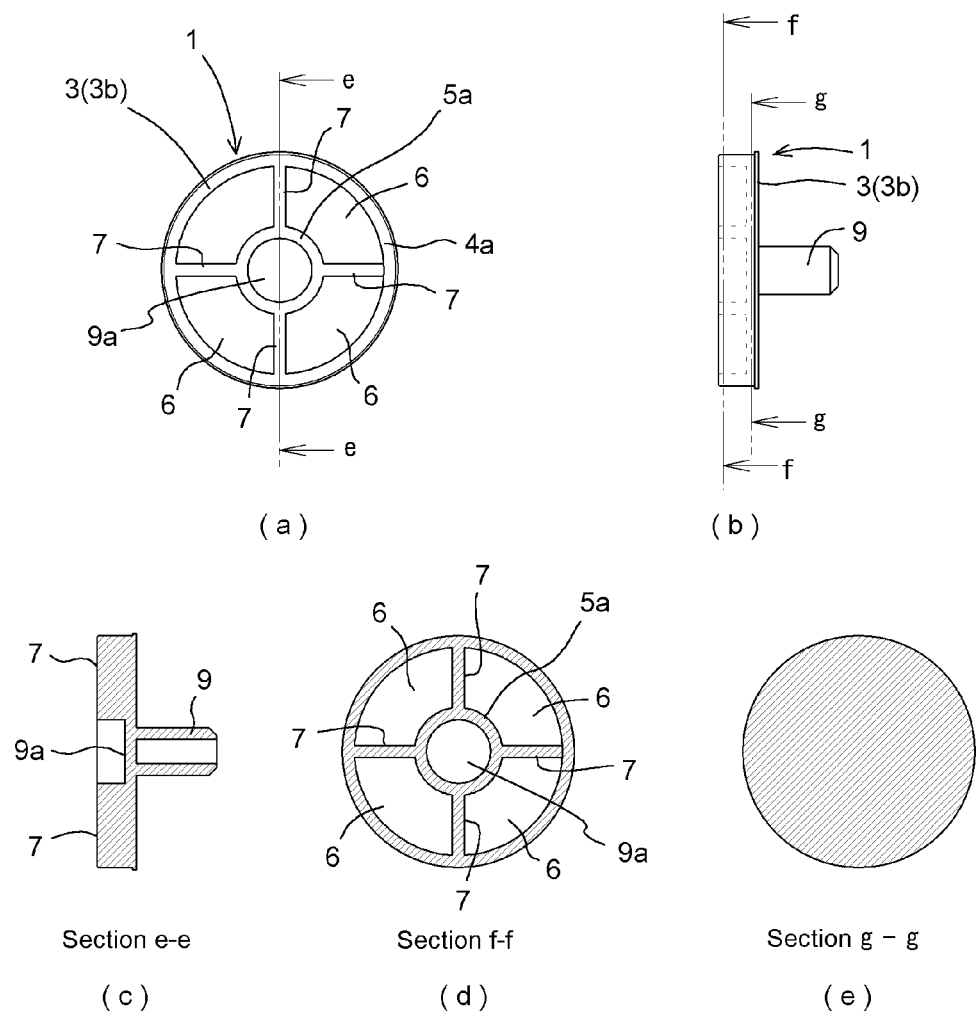
(a)
(b)
Section e-e (c)
Section f-f (d)
Section g-g (e)

[FIG. 5]
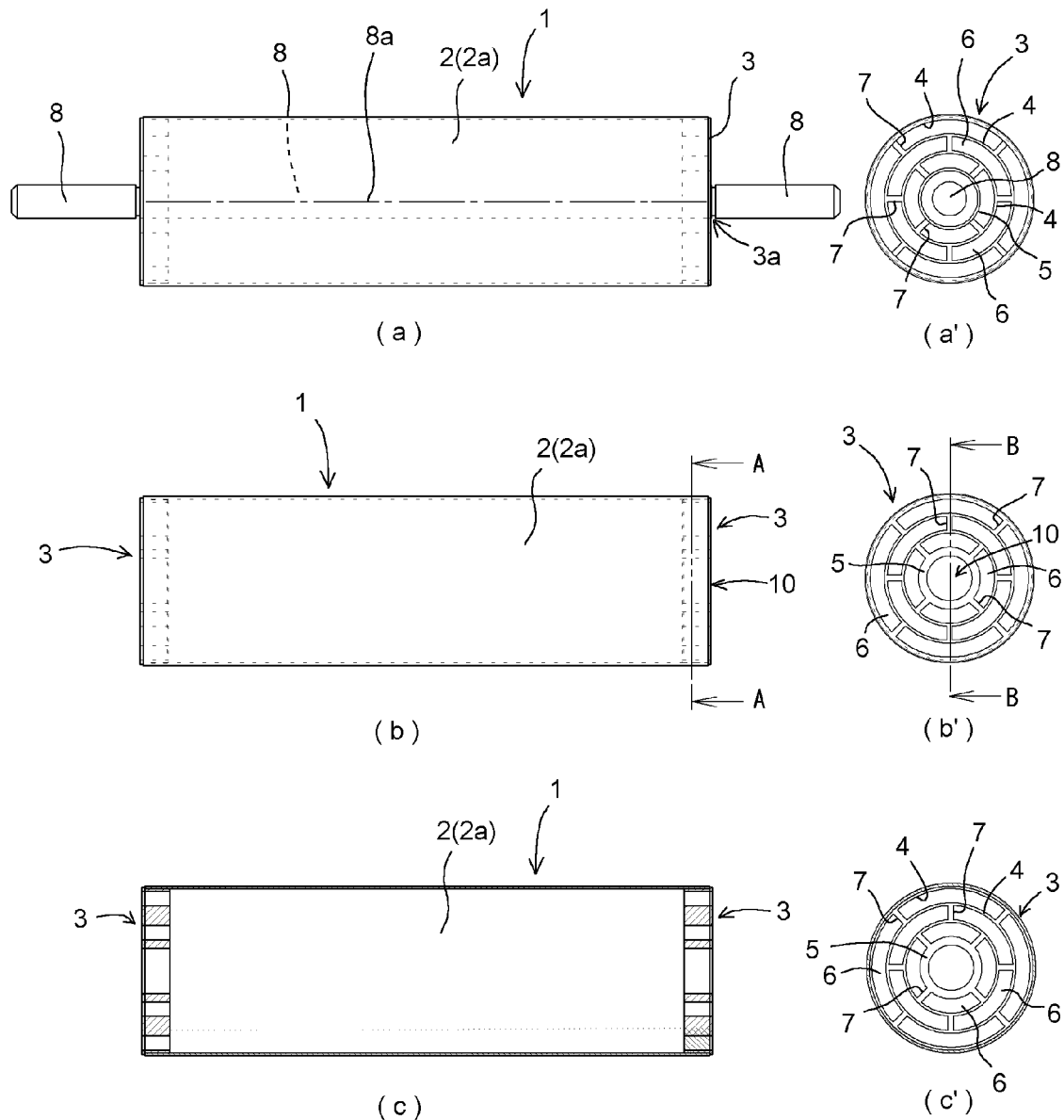

[FIG. 6]
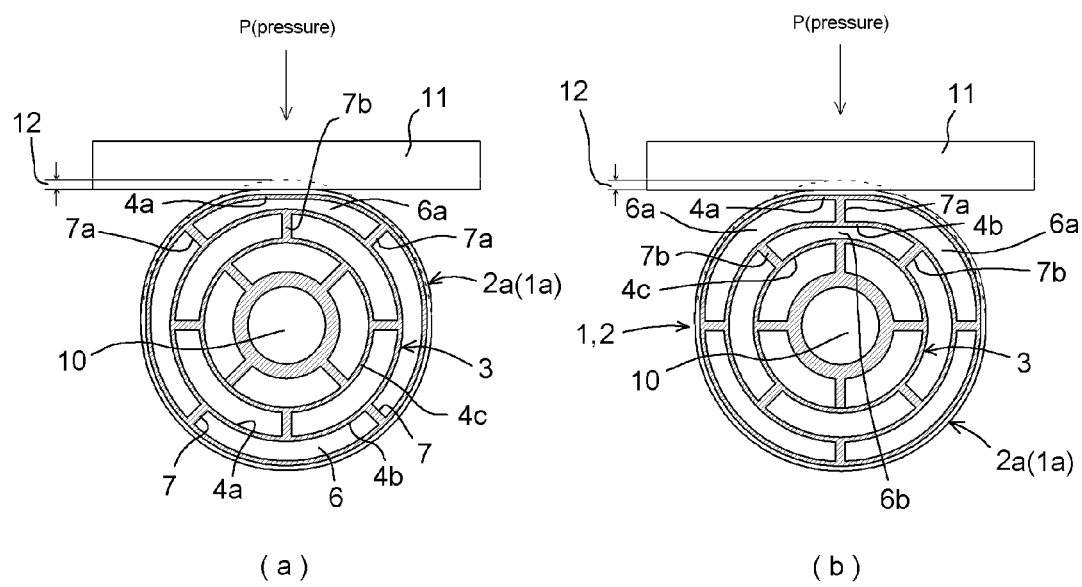

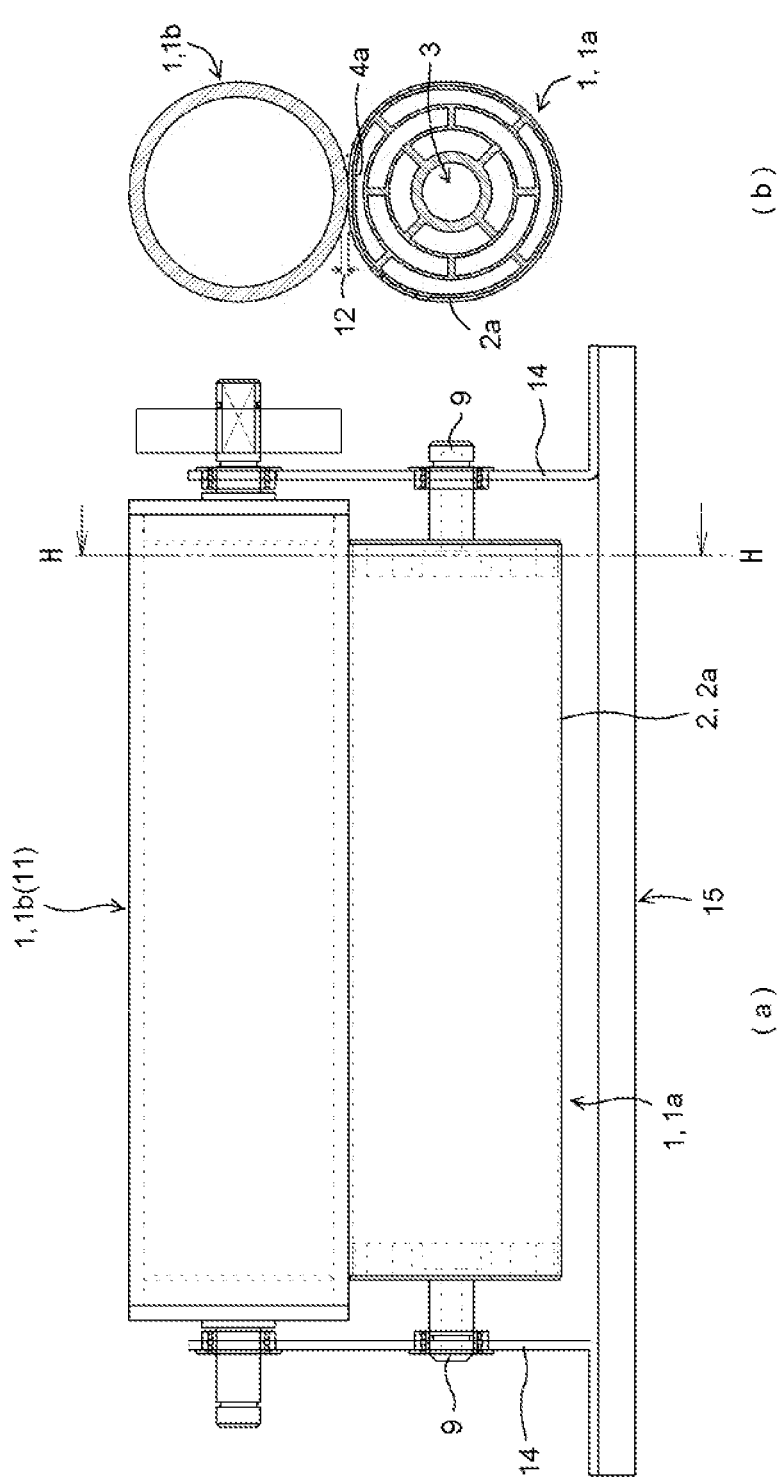
[FIG. 7]

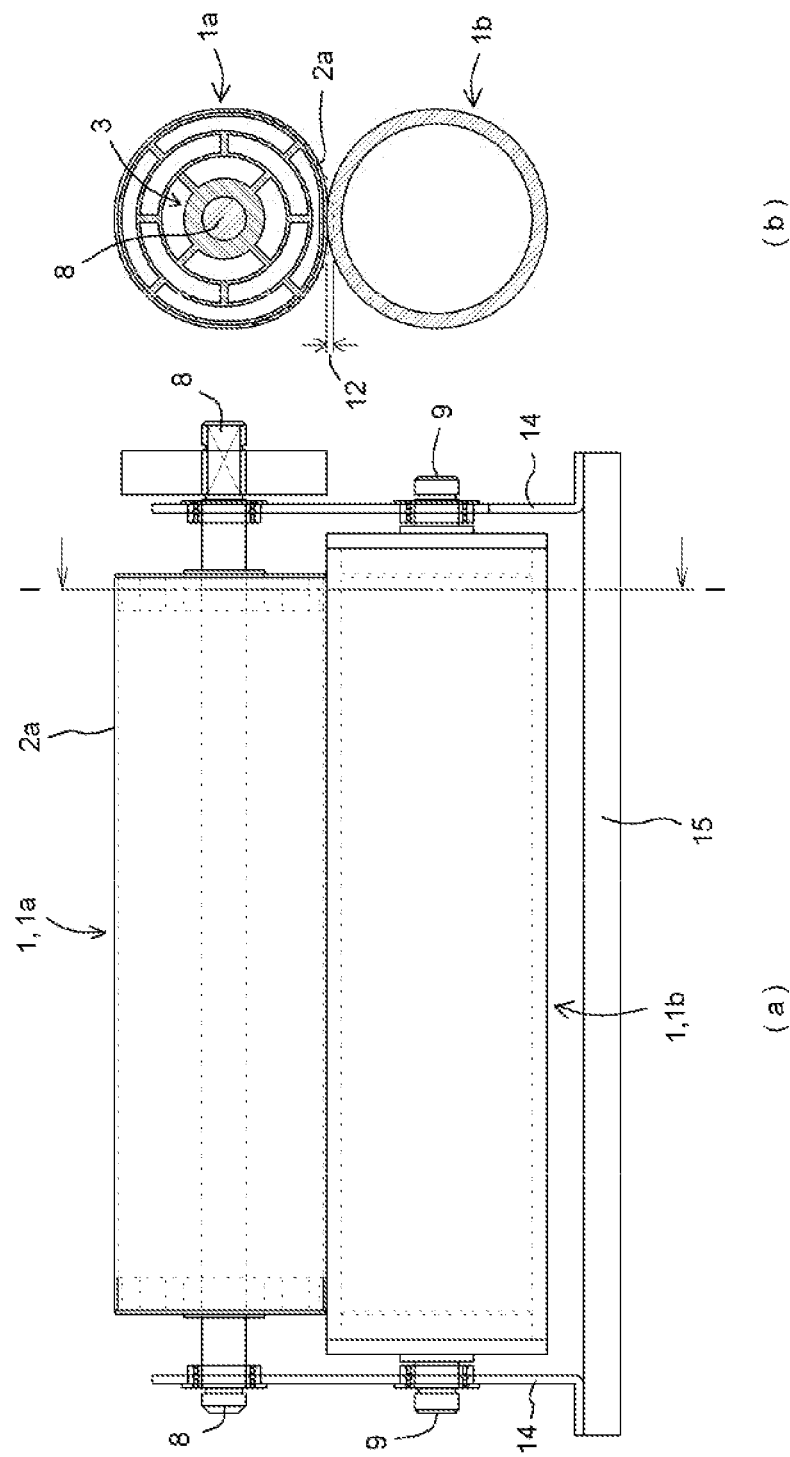

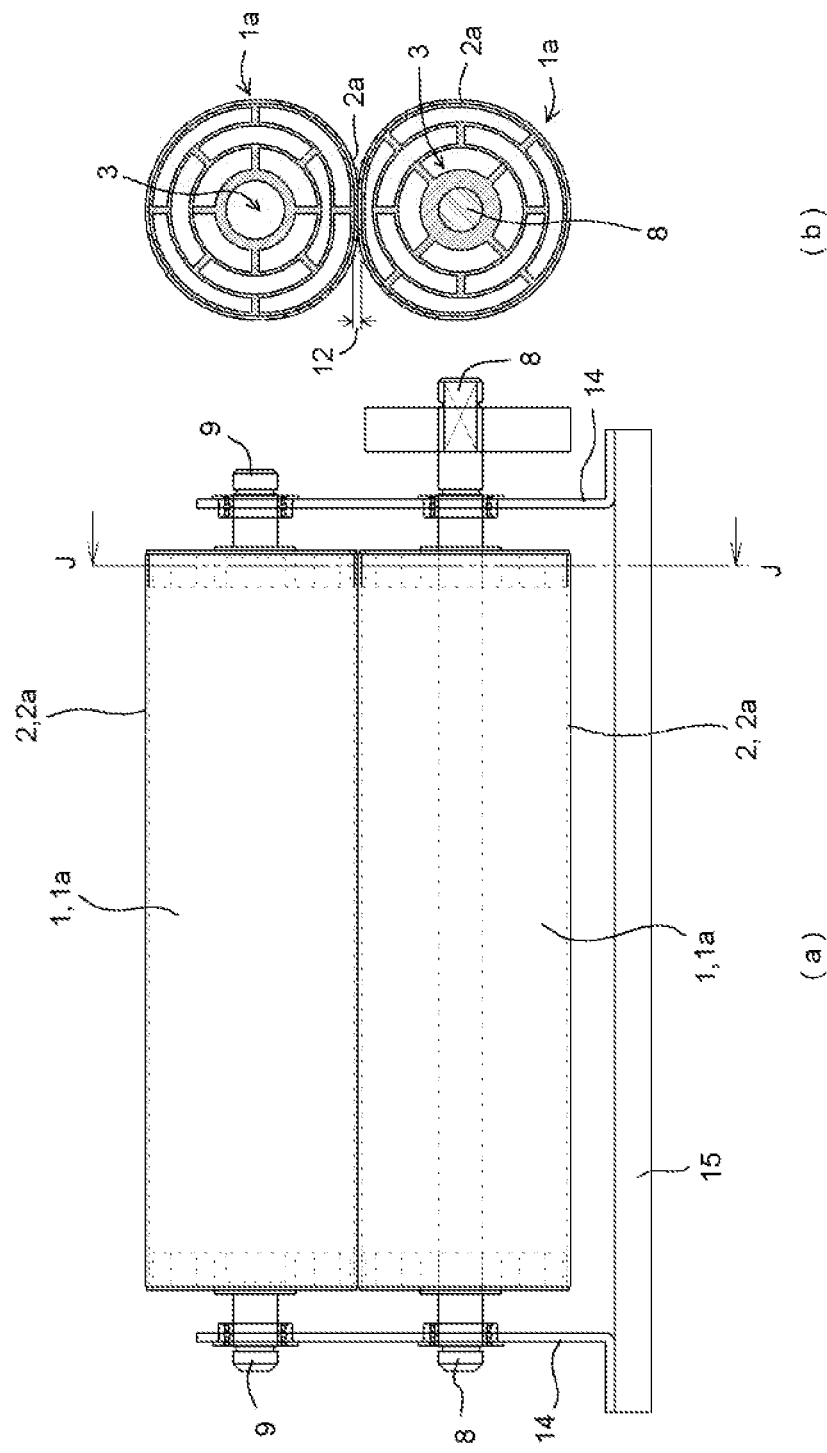

[FIG. 10]
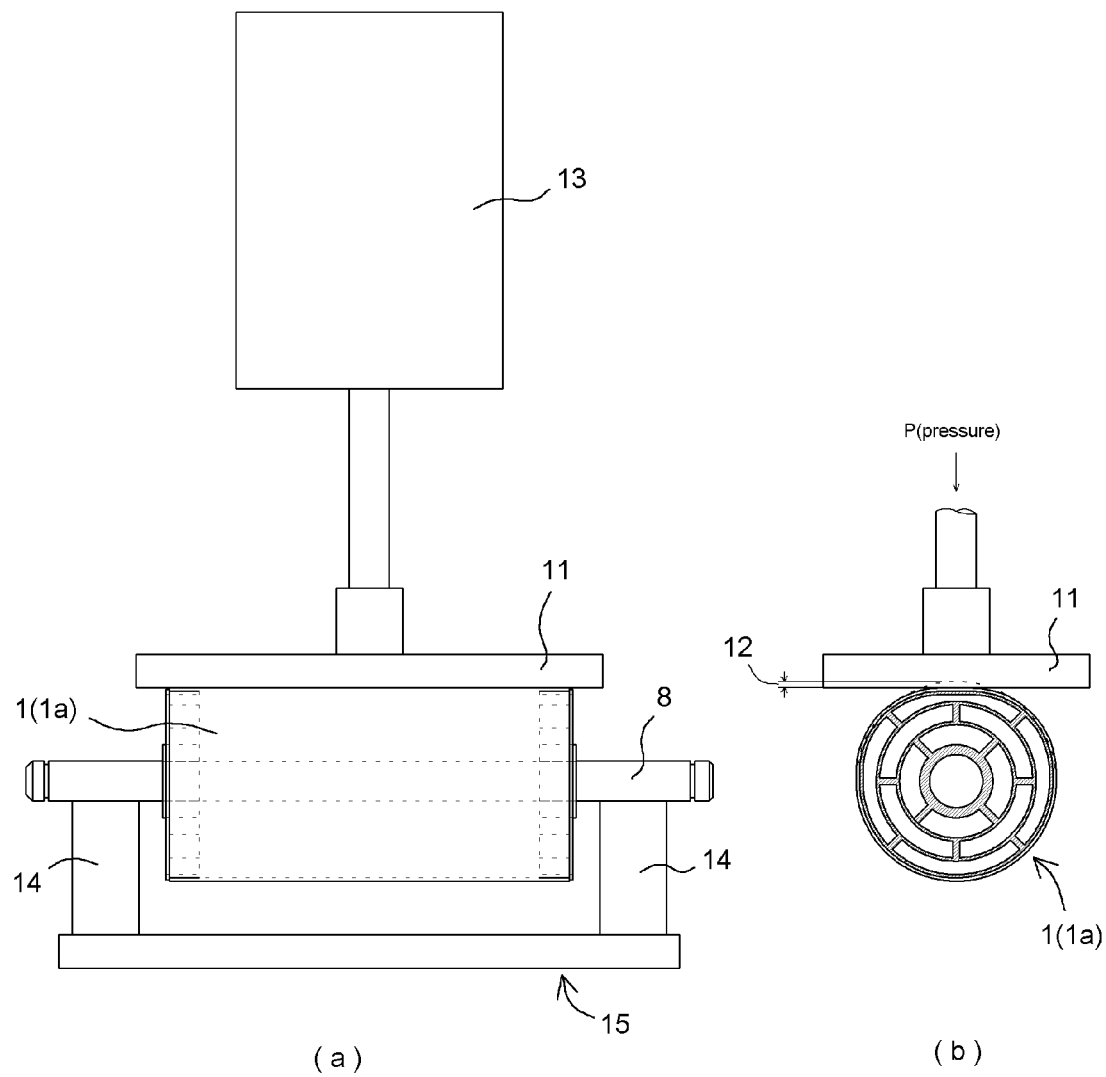
(a)   (b)

ELASTIC ROLLER

TECHNICAL FIELD

The present application relates to a structure for a roller in mechanical field applications where elasticity is required; i.e., an elastic roller.

BACKGROUND ART

Because the typical rollers employed where elasticity is required, e.g., rollers for printing, are employed to transport thin sheets of paper, rollers having surfaces that are covered with rubber so that they may be made to possess elasticity are used. Such rollers which are employed where elasticity is required have a structure in which rubber (elastomer) or a plastic foamed body is provided over a metal core, the reactive-force-producing elasticity of the rubber (elastomer) or the reactive-force-producing elasticity of the plastic foamed body permitting attainment of elasticity. It so happens that the outside diameters of such elastic rollers are such that the outside diameter is formed as a result of having been formed using a die, surface grinding, or the like.

Now, as such an elastic roller, an elastic roller has been disclosed in which a gas at a pressure not less than atmospheric pressure and a liquid are sealed within an inner surface (see, for example, Patent Reference No. 1). However, the elastic roller in such an elastic roller in which a gas at a pressure not less than atmospheric pressure and a liquid are sealed within an inner surface is such that, as the structure of the roller is complicated and the cost thereof is high, it is unsuitable for use as a general-purpose elastic roller.

Moreover, an elastic roller has been disclosed in which a plurality of porous body elastic bodies are laminated in parallel fashion with respect to the axial direction of a rotating body (see, for example, Patent Reference No. 2). However, where elastic bodies are laminated in parallel fashion with respect to the axial direction in such fashion, because there will be occurrence of creases at the seams where these are joined, it is unsuitable for use as an elastic roller where it is required that the roller not have creases in the axial direction on the surface.

Furthermore, an elastic roller has been disclosed in which a plurality of small-bore elastic tubes are arranged at the outer peripheral portion of a roller shaft body, and the group of small-bore elastic tubes is covered by a large-bore elastic tube (see, for example, Patent Reference No. 3). However, with such an elastic roller in which a group of small-bore elastic tubes are arranged at the outer peripheral portion of a shaft body and these are covered by a large-bore elastic tube, as there are regions at which small-bore tube(s) come in contact with the large-bore tube and there are regions at which they do not come in contact therewith, the amount of deformation will vary under constant load. This being the case, there is the problem that when the amount of deformation is made constant, the contact pressure will vary. Furthermore, there are problems such as the fact that because a large-bore elastic tube comprising a rubber member covers a configuration in which a plurality of small-bore tubes are arranged at a shaft body, at locations between where the small-bore elastic tube(s) and the large-bore elastic tube come in contact, in situations where the tension in the large-bore elastic tube covering is high, the tension can cause what should be an arcuate outside diameter at the large-bore elastic tube to become chord-like, producing an polygonal roller, which is a problem, or there can be deformation in the small-bore tube(s), or conversely when tension of the covering is decreased in an attempt to prevent polygonality the small-bore elastic tube(s) tend to come loose therefrom despite the fact that they are covered, and so forth. The disclosed items are therefore unsuitable for actual use.

Moreover, an elastic roller has been disclosed that is a develop roller employing a hollow thin-walled pipe and in which silicone rubber elastic bodies are attached in a double-ended construction (see, for example, Patent Reference No. 4). Furthermore, an elastic roller has been disclosed that is a toner carrier body in which an elastic flange comprising a foamed body is attached to the inner circumferential surface at one end which is in the shape of a hollow cylinder (see, for example, Patent Reference No. 5). Moreover, an elastic roller has been proposed that has an annular elastic body (see, for example, Patent Reference No. 6).

However, the hollow thin-walled cylindrical pipes in the elastic rollers that employ hollow thin-walled cylindrical pipes such as are disclosed in these references are supported by ring-like elastic bodies, elastic flanges, and silicone rubber members that engage with either end thereof, but when such ring-like elastic bodies are disposed in intervening fashion, because shear deformation occurs due to the shear force (shear elasticity) in the direction of rotation of the hollow thin-walled cylindrical pipe, an increase in the shear force will cause the amount of deformation at such ring-like elastic bodies, elastic flanges, and silicone rubber members to likewise increase, which will tend to cause occurrence of failure or delamination at the elastic bodies. Moreover, there is also the problem that when there is occurrence of fluctuation in pressure due to runout or the like of an elastic roller at which such elastic bodies are disposed in intervening fashion, there will be occurrence of fluctuation in shear force, causing fluctuation in the amount of shear deformation as well, which will tend to cause fluctuation in the speed at the surface of the elastic roller. For this reason, they are not suitable for use as elastic rollers where stability in surface speed is required.

Thus, elastic rollers in which gas and/or liquid is sealed within the roller, elastic rollers in which an elastic member for a metal core is provided at the surface so the reactive-force-producing elasticity of the elastic member can be utilized, and rollers employing a hollow thin-walled pipe and employing elastic bodies at the ends, have conventionally been disclosed as methods for forming elastic rollers.

However, with elastic rollers in which a metal core is covered with an elastic member, so as to permit attainment of a large deformation of the elastic member with a prescribed load, a method may be adopted in which thickness of an elastic body is increased, or a method may be adopted in which a material having a low modulus of elasticity is employed. With these come such factors as the fact that combination of the masses of the metal core and the rubber member serving as elastic body will result in a heavy roller, and the fact that a roller that employs rubber or another such elastic body of large thickness, or an elastic roller that moreover employs elastic bodies disposed in intervening fashion, will be such that the shear elasticity of the elastic body will cause the surface speed to become unstable. Moreover, where rubber is employed, because this will involve vulcanization operations and grinding operations, time will be required for manufacturing operations, and cost will increase.

Furthermore, because, as described above, elastic rollers that employ an elastic body comprising a plastic foamed body or rubber or another such elastic body at the ends of a thin-walled pipe capable of elastic deformation make connection to a drive shaft by way of intervening elastic flanges, there are descriptions to the effect that instability in the force from the rotating drive shaft causes occurrence of problematic situations (see, for example, Patent Reference No. 7). This is thought to be due to the fact that because connection to the drive shaft is made by way of intervening elastic flanges, the load thereon produces shear elasticity in the elastic body of the elastic flange, which causes instability in surface speed.

Moreover, with a rubber roller that is covered with rubber of such thickness as to be capable of elastic deformation, in situations such as when transporting thick sheets of width very much less than the width of the roller, at locations where rubber rollers contact each other and at locations where a thick sheet is held in the nip formed therebetween, because the way in which the rubber roller deforms changes, there is a phenomenon in which the shear elasticity that is produced causes the rubber of the rubber roller to fail.

PRIOR ART REFERENCES

Patent References

Patent Reference No. 1: Japanese Patent Application Publication Kokai No. 2006-207790
Patent Reference No. 2: Japanese Patent Application Publication Kokai No. 2006-75718
Patent Reference No. 3: Japanese Patent Application Publication Kokai No. 2007-147990
Patent Reference No. 4: Japanese Patent Application Publication Kokai No. H4[1992]-75073
Patent Reference No. 5: Japanese Patent Application Publication Kokai No. H9[1997]-171296
Patent Reference No. 6: Japanese Patent Application Publication Kokai No. 2011-149461
Patent Reference No. 7: Japanese Patent Application Publication Kokai No. 2001-42633

SUMMARY OF INVENTION

Problem to be Solved by Invention

A problem to be solved by the present invention is therefore to provide an elastic roller which is capable of elastic deformation at low load, which is lightweight and low-cost, and which is such that the surface speed of the roller has been made stable.

Means for Solving Problem

Means for solving the problems of the present invention are such that, at a first means, in the context of a roller having a cylindrical pipe and flanges at two ends thereof, the cylindrical pipe is a thin-walled cylindrical pipe and comprises a material that deforms so as to produce a reactive-force-producing load and reactive-force-producing elasticity when a load is applied in an axial direction of this pipe. Moreover, the structure of the flanges disposed at the two ends of the thin-walled cylindrical pipe is such that there are a plurality of thin-walled annular rings of differing diameters along circumferential loci of differing diameters (i.e., concentric circumferential loci) that are peripheral to a same axial location, and there are a plurality of ribs arranged so as to be perpendicular to the respective rings in uniformly spaced fashion in an annular gap between those which, among these annular rings of differing diameters, are a small-diameter ring and a large-diameter ring mutually adjacent to this small-diameter ring. Elastically deformable flanges at the two ends are formed in integral fashion from this plurality of ribs and annular rings of differing diameters It is an elastic roller having an elastically deformable thin-walled cylindrical pipe and elastically deformable flanges characterized in that the two ends of the thin-walled cylindrical pipe engage with and are captured by outside circumferences of outermost peripheral rings of the flanges at these two ends, and it is possible for this thin-walled cylindrical pipe and the flanges at these two ends to both undergo elastic deformation in a same direction when a load abuts the thin-walled cylindrical pipe.

A second means is an elastic roller having the elastically deformable thin-walled cylindrical pipe and the elastically deformable flanges according to the first means characterized in that the flanges present at the two ends of the thin-walled cylindrical pipe have holes at central portions thereof through which a shaft that supports the elastic roller passes, ends of the shaft being disposed at exteriors of these holes, or shaft-shaped bodies that support the elastic roller are disposed outside central portions of the flanges.

In accordance with a third means, the flanges present at the two ends of the thin-walled cylindrical pipe are resin flanges comprising molding of resin. These resin flanges have a plurality of the thin-walled annular rings of differing diameters in concentrically shaped fashion, this plurality of rings of differing diameters are supported by ribs arranged in uniformly spaced fashion, and an outermost ring engages with the thin-walled cylindrical pipe. Central portions of the resin flanges are formed so as to have structures such that they are supported with rings by ribs, and have holes through which a shaft passes, or are formed as shaft-shaped bodies, the configuration being such that the resin flanges at the two ends deform in a same direction as the thin-walled cylindrical pipe deforms when a compressive load acts on this elastic roller.

A fourth means is an elastic roller having the elastically deformable thin-walled cylindrical pipe and the elastically deformable flanges according to any one means among the first through third means characterized in that the thin-walled cylindrical pipe is such that when Young's modulus of material of the cylindrical pipe is taken to be $E_1$, second moment of area of the cylindrical pipe is taken to be $I_1$, length in a long direction of the cylindrical pipe is taken to be L, and wall thickness of the cylindrical pipe is taken to be $t_1$, Young's modulus of material of the flanges at the two ends of the cylindrical pipe is taken to be $E_2$, second moment of area of the rings of the flanges is taken to be $I_2$, width of the rings of the flanges is taken to be b, and thickness of the rings of the flanges is taken to be $t_2$, the roller is formed so as to satisfy $$E_1 \times I_1 \geq E_2 \times I_2 \qquad (1)$$

or $$E_1 \times L \times (t_1)^3 \geq E_2 \times b \times (t_2)^3 \qquad (2)$$

inequality (1) or (2); the flanges at the two ends of this roller have a plurality of concentrically shaped rings including an outermost ring; this plurality of concentrically shaped rings are such that mutually adjacent rings are supported by a plurality of ribs arranged in annular fashion so as to be uniformly spaced in a centrifugal direction; a plurality of ribs arranged in annular and uniformly spaced fashion in the centrifugal direction for maintaining the annularity and uniform spacing of the respective rings in a gap between that ring thereamong which is a middle ring and a ring toward the inside therefrom are arranged in annular and uniformly spaced fashion with respect to a plurality of ribs arranged in annular and uniformly spaced fashion in the centrifugal direction for maintaining the annularity and uniform spacing of the respective rings in the gap between the foregoing ring thereamong which is a middle ring and a ring toward the outside therefrom, within a portion intermediate between locations at which ribs among a plurality of ribs arranged in annular and uniformly spaced fashion mutually support that outside ring; an innermost ring in a region having a hole through which a shaft passes at the flange at the two ends or a region having a shaft-shaped body comprising a molded part is supported by this plurality of ribs arranged in annular and uniformly spaced fashion; rings comprising this innermost ring and a plurality of rings toward the outside therefrom are joined together in integral fashion; an outermost ring is formed so as to produce reactive-force-producing elasticity as a result of a stress in the axial direction of the shaft; the roller as described above has flanges which are capable of deformation in a diameter direction at the two ends of the cylindrical pipe; and a direction in which the flanges deform and a direction in which the thin-walled cylindrical pipe deforms when a pressing load acts on this roller are a same direction.

A fifth means is the elastic roller having the elastically deformable thin-walled cylindrical pipe and the elastically deformable flanges according to any one means among the first through fourth means characterized in that a surface of the elastic roller is such that the surface is covered with a coating that is at least one species selected from among a group consisting of silicone, urethane, and Teflon (registered trademark).

A sixth means is the elastic roller having the elastically deformable thin-walled cylindrical pipe and the elastically deformable flanges according to any one means among the first through fourth means characterized in that a surface of the elastic roller is covered by woven/knit fabric.

A seventh means is the elastic roller having the elastically deformable thin-walled cylindrical pipe and the elastically deformable flanges according to any one means among the first through fourth means characterized in that the elastically deformable thin-walled cylindrical pipe used in the elastic roller is made from an electrically conductive material.

Benefit of Invention

As a result of adoption of the foregoing means, elastic rollers in accordance with the present invention are elastic rollers which are capable of elastic deformation at low load, which are lightweight and low-cost, and which are such that rotational speed at the surface of the roller has been made stable. Moreover, because elastic rollers in accordance with the present invention are provided with flanges that support a thin-walled cylindrical pipe at both end faces of the pipe, they are elastic rollers which are such that it is possible for the flanges at the two ends to deform together with deformation occurring at the thin-walled cylindrical pipe due to stress. Furthermore, they are elastic rollers which are such that application of stress causes elastic deformation by the thin-walled cylindrical pipe and by the flanges at the two ends thereof in integral fashion without regard to whether an elastic material is present at the surface of the thin-walled cylindrical pipe. Moreover, because the elastic rollers are imparted with gripping characteristics, a covering comprising a material having a high coefficient of friction is formed at the surface of the thin-walled cylindrical pipe of the elastic roller; furthermore, because the thickness of that covering is a thickness such as will not cause occurrence of shear elasticity under load, they are elastic rollers having increased life.

BRIEF DESCRIPTION OF DRAWINGS

FIG. 1 Drawing of an example in which shaft-shaped bodies are present at either side end of an elastic roller in accordance with the present invention, (a) being a front view of the elastic roller, (b) being a side view of (a), (c) being a view of section B-B at (b), and (d) being a view of section A-A at (a).

FIG. 2 Drawing showing an example of how an elastic roller in accordance with the present invention might be assembled.

FIG. 3 Drawing showing the structure of another elastic roller in accordance with the present invention.

FIG. 4 Drawing showing an example of the structure of a conventional roller flange.

FIG. 5 Drawing showing an example of the structure of a flange and an elastic roller having a shaft at the axis in accordance with the present invention.

FIG. 6 Drawing showing an example of how a roller in accordance with the present invention might undergo elastic deformation.

FIG. 7 Drawing showing example of use of the combination of a rigid roller, above, and an elastic roller in accordance with the present invention, below.

FIG. 8 Drawing showing example of use of the combination of an elastic roller in accordance with the present invention, above, and a rigid roller, below.

FIG. 9 Drawing showing example of use of the combination of elastic rollers respectively in accordance with the present invention, above and below.

FIG. 10 Drawing showing the amount of deformation and the reactive-force-producing load as measured by a tension meter.

EMBODIMENTS FOR CARRYING OUT INVENTION

FIG. 1 shows an example of a roller 1 in accordance with the present invention in which shaft-shaped bodies 9 that are equivalent to and that operate in the same manner as a shaft are provided in integral fashion with respect to flanges 3. (a) in FIG. 1 shows a front view of the elastic roller, (b) in FIG. 1 shows a side view thereof, (c) in FIG. 1 is a front view of section B-B at (b), and (d) in FIG. 1 shows a side view which is a front view of section A-A at (a). Provided at the present example are thin-walled cylindrical pipe 2a which is capable of elastic deformation, and flanges 3 which are capable of elastic deformation and which are matably inserted in the two ends 2b of this thin-walled cylindrical pipe 2a. Flange 3 is described in terms of an example of a flange that is a molded resin part formed by molding resin, flange 3 comprising shaft 8, and large, medium, and small rings 4. Annular gaps 6 are respectively present between the shaft-shaped bodies 9 which are equivalent to a shaft and these large, medium, and small rings 4. Respectively arranged in annular and uniformly spaced fashion at this plurality of annular gaps 6 are a plurality of ribs 7, the large, medium, and small rings 4 and the shaft-shaped bodies 9 being respectively mutually coupled and supported by the ribs 7. Left and right shaft-shaped bodies 9 which are equivalent to a shaft are formed so as to respectively protrude to the left and right from flanges 3. Roller 1 in accordance with the present invention which comprises such structure is such that flanges 3 also undergo elastic deformation in the direction of axis 8*a* as they follow the elastic deformation in the direction of axis 8*a* which is equivalent to shaft 8 that occurs due to pressing forces acting on thin-walled cylindrical pipe 2*a*.

That is, at the example shown in FIG. 1, axis 8*a* which is equivalent to a shaft and the large, medium, and small, i.e., three, rings 4 which are provided at flange 3 are made integral and are coupled and supported by the plurality of ribs 7 which are arranged in uniformly spaced fashion at annular gaps 6. Accordingly, when pipe 2 of roller 1 is under a load due to stresses acting thereon, this load causes rings 4 which form flange 3 to respectively resiliently deform in the direction of axis 8*a* which is equivalent to a shaft at the respective centers thereof. Where this is the case, of the components that make up flange 3 as described above, ribs 7 present in annular gap 6 between outermost ring 4 and middle ring 4, and ribs 7 present in annular gap 6 between middle ring 4 and innermost ring 4, are disposed so as to be at mutually different locations in those respective gaps; and ribs 7 present in annular gap 6 between middle ring 4 and innermost ring 4, and ribs 7 present in annular gap 6 between innermost ring 4 and shaft-shaped body 9, are disposed so as to be at mutually different locations in those respective gaps. Accordingly, when pipe 2 of roller 1 is under a load due to stresses acting in the direction of axis 8*a* which is equivalent to a shaft as described above, rings 4 forming flange 3 are pressed on and respectively resiliently deform in the direction of axis 8*a* which is equivalent to a shaft at the respective centers thereof. Furthermore, at outermost ring 4, so that either end 2*a* of pipe 2 does not protrude to the exterior beyond flange 3 at either end thereof, cap 3*c*, which serves as stopper during press-fitting of pipe 2, is such as to cause the endmost portion at the surface at the outside diameter of flange 3 to be raised in annular and integral fashion by an amount corresponding to the thickness of thin-walled cylindrical pipe 2*a* so as to receive flange 3 at the end face of thin-walled cylindrical pipe 2*a* and prevent it from entering the interior of thin-walled cylindrical pipe 2*a*.

FIG. 2 is a drawing showing by way of illustration an example of how roller 1 in accordance with the present invention which is shown in FIG. 1 might be assembled. Flange 3 having shaft-shaped body 9 which protrudes toward the left at (b) in FIG. 2, and flange 3 having shaft-shaped body 9 which protrudes toward the right at (c) in FIG. 2, are matably inserted into the left and right ends of pipe 2, i.e., thin-walled cylindrical pipe 2*a*, shown at (a) in FIG. 2, to form roller 1. At FIG. 2, note that (d) is a side view of left-side flange 3 shown at (b), and (e) is a side view of right-side flange 3 shown at (c).

FIG. 3 shows an example of the structure of flange 3 employed at the end of an elastic roller 1*a* in accordance with the present invention, the example of roller 1 in accordance with the present invention at FIG. 1 being an example in which flange 3 is such that shaft-shaped body 9 is present at the end of flange 3 in integral fashion therewith and it comprises a molded resin part. (a) in FIG. 3 is a view as seen from the left of flange 3 shown at (b) in FIG. 3. Because the example of flange 3 is molded resin, it can be molded in such fashion that unnecessary locations are hollowed out (recessed), the central region at (a) in FIG. 3 being the back face 9*a* of shaft-shaped body 9, and the annular portion thereabout being shaft-receiving equivalent body 5*a*. Innermost ring 4*c* which is supported by four inside ribs 7*c* is present about the periphery of shaft-receiving equivalent body 5*a*, middle ring 4*b* which is supported by four intermediate ribs 7*b* is present about the periphery of innermost ring 4*c*, and outermost ring 4*a* which is supported by outside ribs 7*a* is present about middle ring 4*b*. (c) in FIG. 3 is a view of section E-E at (a) in FIG. 3 as seen from the direction indicated by the arrows, (d) in FIG. 3 is a view of section F-F at (b) in FIG. 3 as seen from the direction indicated by the arrows, and (e) in FIG. 3 is a view of section G-G at (b) in FIG. 3 in which section 9*b* of shaft-shaped body 9 is seen from the direction indicated by the arrows. When this flange 3 in accordance with the present invention which is shown in FIG. 3 is compressed from above, it is resiliently downwardly indented as will be described below.

FIG. 4 is a drawing showing an example of a flange 3 in which there is a shaft-shaped body 9 at an end of a flange 3 comprising a molded resin part at a conventional roller 1, (a) in FIG. 4 being a flange 3 which is a rigid body which is constituted so as to cause wall thickness to be uniform where a thick-walled portion is recessed at a conventional molded resin part, and being a drawing as seen from the left of flange 3 shown at (b) in FIG. 4. The central region at (a) in FIG. 4 is the back face 9*a* of shaft-shaped body 9; elsewhere therein, the four in fan-like arrangement at (a) in FIG. 4 are outside annular gap 6*a* between outermost ring 4*a* and outer middle ring 4*b*, intermediate annular gap 6*b* between outer middle ring 4*b* and innermost ring 4*c*, and innermost ring 4*c*, (c) in FIG. 4 being a view of section e-e at (a) in FIG. 4 as seen from the direction indicated by the arrows. (d) in FIG. 4 is a view of section f-f at (b) in FIG. 4 as seen from the direction indicated by the arrows. (e) in FIG. 4 is a view of section g-g at (b) in FIG. 4 as seen from the direction indicated by the arrows. As can be seen in the portion at section g-g at (e) in FIG. 4, this conventional rigid flange 3*b* comprises a solid integral body. Accordingly, when such a flange 3 is pressed on by pressure applied thereon from above, because it is rigid it will not be indented in downward fashion.

At FIG. 5, unlike roller 1 in which there were shaft-shaped bodies 9 at either end of the elastic roller shown in FIG. 1, there is a shaft 8 which passes through axis 8*a* of roller 1 in such fashion that the ends of shaft 8 are made to protrude to the exterior of flanges 3 at either end thereof. That is, roller 1 shown at (a) in FIG. 5 is such that at thin-walled cylindrical pipe 2*a*, instead of shaft-shaped bodies 9, there is a shaft 8 which is inserted within the portion corresponding to axis 8*a* thereof as shown at (a) in FIG. 5; furthermore, this roller 1 is such that the left and right ends of shaft 8 are made to protrude from flanges 3 at the left and right ends of pipe 2*a*. Moreover, (a') in FIG. 5 is a view as seen from the right side of thin-walled cylindrical pipe 2*a* at (a), (b) in FIG. 5 is a drawing of thin-walled cylindrical pipe 2*a* as it would appear when shaft 8 is removed from shaft-receiving part 5, and (b') in FIG. 5 is a side view of flange 3 as seen from the right end of thin-walled cylindrical pipe 2*a* at (b) in FIG. 5. (c) in FIG. 5 is a front view of thin-walled cylindrical pipe 3 in the drawing as seen from the direction indicated by the arrows of section B-B at (b') which is a drawing showing flange 3 at the right end of thin-walled cylindrical pipe 2*a*, and (c') is a side view as seen from the right in the direction indicated by the arrows of section A-A at (b) in FIG. 5.

FIG. 6 is an exemplary drawing showing how pipe 2 and flange 3 might deform when a pressure is applied on roller 1 in accordance with the present invention. When roller 1 in accordance with the present invention having such pipe 2 and flange 3 is pressed downward by pressure P from pressure-applying body 11 above pipe 2 as can be seen at (a) in FIG. 6, it undergoes elastic deformation as a result of being supported by shaft-shaped body 9 which protrudes to the exterior from central portion 3a of flange 3 having axis 8a at shaft 8 as can be seen in FIG. 1 and FIG. 2, or by either end of shaft 8 which passes through axis 8a to protrude to the exterior of roller 1 from central portion 3a of flange 3 as can be seen at (a) in FIG. 5. At (a) in this FIG. 6, thin-walled cylindrical pipe 2a of elastic roller 1a is pressed downward from above by pressure-applying body 11 having pressure P which is directly above a location in outside gap 6a where none of the four outermost ribs 7a disposed in uniformly spaced fashion in outermost gap 6a between outermost ring 4a of flange 3 and middle ring 4b which is mutually adjacent thereto and toward the interior therefrom is present; or stating this another way, directly above a location in outside gap 6a which is intermediate between two mutually adjacent ribs 7a that are separated from each other so as to be disposed at left and right. Accordingly, outermost ring 4a and thin-walled cylindrical pipe 2a at that location press upward in resilient fashion, and are indented therebelow by amount of indentation 12. That is, the upper portion of outermost ring 4a is supported by two points, these being the upper set of left and right outside ribs 7a, 7a, as a result of which it exhibits deformation pursuant to deflection theory.

Moreover, at (b) in FIG. 6, one of the four outside ribs 7a disposed in uniformly spaced fashion in outer gap 6a between outermost ring 4a of flange 3 and ring 4b toward the interior therefrom is present at a location intermediate between and above gaps 6a, 6a to the left and right therefrom; furthermore, outermost ring 4a and middle ring 4b are supported and coupled by the upper pair of left and right intermediate ribs 7b, 7b between middle ring 4b and inner ring 4c. While in this state, when pressure P from pressure-applying body 11 at the upper portion acts on the upper portion of outermost ring 4a of pipe 2 at elastic roller 1a, the upper central portion of outermost ring 4a will deform downward, as a result of which the upper central portion of middle ring 4b, which is supported by the upper set of left and right intermediate ribs 7b, 7b, will be pressed downward by way of outside rib 7a and will exhibit deformation. That is, middle ring 4b is supported at two points by the upper set of left and right intermediate ribs 7b, 7b, as a result of which it also will exhibit deformation pursuant to beam deflection theory. Elastic roller 1a in accordance with the present invention is thus constituted in such fashion that the structure of flange 3 at either end of thin-walled cylindrical pipe 2a is such that a plurality of rings 4 are supported by rib(s) 7 in such fashion as to cause a plurality of curved beams to be present in superposed fashion. In other words, as a result of adoption of a structure at flange 3 that comprises a structure in which a plurality of curved beams form rings 4, flange 3 is such that notwithstanding that they are rings 4 it is still possible based on beam deflection theory for them to deform under stress. In addition, such elastically deformable flange 3 is provided at either end of elastically deformable thin-walled cylindrical pipe 2a to constitute elastic roller 1a. As a result of adoption of such constitution, it is possible to achieve a constitution which is such that when pressure acts on elastically deformable elastic roller 1a, rings 4 deform simultaneous with deformation of thin-walled cylindrical pipe 2a, as a result of which it is possible to accommodate a reactive-force-producing load pursuant to beam deflection theory, without the need to employ foamed bodies, rubber, or elastomer.

Elastic roller 1a in accordance with the present invention comprises thin-walled cylindrical pipe 2a capable of elastic variable and flanges 3 provided at the ends of thin-walled cylindrical pipe 2a, the constitution being such that flange 3 deforms in the same direction as deformation of thin-walled cylindrical pipe 2a, the constitution being such that ring 4 portions at flange 3 are supported at two points by ribs 7 which are arranged in uniformly spaced fashion pursuant to beam deflection theory, and conditions at these ring 4 portions that are supported at two points permitting application of beam theory. Accordingly, the amount of deflection (amount of deformation) at flange 3 is such that the amount of deflection is determined by load P, the exponential of the length 1 of the portion of ring 4 (beam) that is between the ribs, the inverse of the elastic modulus $E_2$ of the material of flange 3 (beam), and the inverse of the second moment of area 12 of ring 4 at flange 3. Moreover, likewise with respect to the amount of deformation of thin-walled cylindrical pipe 2a, deformation at pipe 2 is such that the amount of deformation is determined by load P, the cube of the radius of curvature ρ of thin-walled cylindrical pipe 2a, the inverse of the elastic modulus $E_1$ of the material of thin-walled cylindrical pipe 2a, and the inverse of the second moment of area $I_1$ of pipe 2. This being the case, to cause elastic roller 1a to be deformed by a load that abuts elastic roller 1a, it being necessary that flange 3 at the end be made to deform and that thin-walled cylindrical pipe 2a be made to deform, it is preferred that the constitution be such as to at least cause the relationship between the flexural strength of flange 3 and thin-walled cylindrical pipe 2a to satisfy $E_1 \times I_1 \geq E_2 \times I_2$ or $E_1 \times L \times (t_1)^3 \geq E_2 \times b \times (t_2)^3$, and it is more preferred where the basic constitution of flange 3 at either end is the same constitution that $$E_1 \times I_1 \geq 2 \times E_2 \times I_2$$

or that $$E_1 \times L \times (t_1)^3 \geq 2 \times E_2 \times L \times (t_2)^3,$$

allowing nip width (the amount of deformation) as a function of the axial direction to be made uniform. Note that L is the length in the direction of shaft 8 of pipe 2, b is the width (lateral width) in the axial direction of the ring 4 portion of flange 3, $t_1$ is the wall thickness of pipe 2, and $t_2$ is the thickness of the ring 4 portion of flange 3.

Furthermore, the general formula for the amount of diametric displacement in the vertical direction at thin-walled cylindrical pipe 2a is $$\text{Amount of displacement } \delta y = -P\rho^3 / (E \times I) \times \{(1/\pi) - (1/4)\}$$
$$= -P\rho^3 / (E \times (L \times t_1^3 / 12)) \times \{(1/\pi) - (1/4)\},$$

where P is load, ρ is the radius of curvature of the pipe, E is elastic modulus, I is the second moment of area, L is the length of the pipe, and $t_1$ is the wall thickness of the pipe. Therefore, to cause deformation at low load, selection of material(s) having low modulus of elasticity and appropriate choice of wall thickness at pipe 2 will be necessary. To cause deformation of elastic roller 1a having roller load, roller length, and predetermined roller outside diameter, it will therefore be necessary to select materials (selection of modulus of elasticity) and to select pipe wall thickness $t_1$, to constitute the thin-walled cylindrical pipe 2a necessary to cause deformation in the vertical direction (axial direction), and to make sure that flange 3 does not markedly impede deformation of thin-walled cylindrical pipe 2a. For this reason, the constitution should be such as to cause the flexural strength of the ring 4 portion of flange 3 to be the same as or less than the flexural strength of thin-walled cylindrical pipe 2*a*, and the constitution should be such as to cause deformation of elastic roller 1*a* to be such that thin-walled cylindrical pipe 2*a* is made to deform together with flange 3. Accordingly, by causing the constitution to be such that the relationship between the flexural strength of flange 3 and thin-walled cylindrical pipe 2*a* at least satisfies the relationship indicated at the foregoing relationship $$E_1 \times I_1 \geq E_2 \times I_2 \text{ or } E_1 \times L \times (t_1)^3 \geq E_2 \times b \times (t_2)^3,$$

it is possible to cause flange 3 having rings 4 and thin-walled cylindrical pipe 2*a* which are capable of elastic deformation in the vertical direction to deform; and where the basic constitution of flange 3 at either end is the same constitution, because causing $$E_1 \times I_1 \geq 2 \times E_2 \times I_2$$

or $$E_1 \times L \times (t_1)^3 \geq 2 \times E_2 \times b \times (t_2)^3$$

to be satisfied will make it possible for deformation to occur at lower load, this is more preferred.

Furthermore, when flange 3 having a plurality of rings is made to be such that ribs 7 which support rings 4 are arranged at uniform angles (uniform spacing), lengths of arcs formed by ribs 7 are such that outermost ring 4*a* is longest, the arcs of rings 4 supported by ribs 7 becoming shorter, and the reactive-force-producing load becoming greater, the nearer they are to the central direction. Therefore, a constitution in which thickness $t_2$ of rings 4 that determine the reactive-force-producing load is made thinner the nearer one is to the central direction is more preferred, or it is more preferred that the constitution be such that ribs 7 are arranged in such fashion that the lengths of arcs formed as a result of being supported by ribs 7 are more or less constant.

As a result of adoption a constitution such as the foregoing, it will be possible to constitute an elastic roller 1*a* in which pipe 2 is resin while flange 3 comprises resin, an elastic roller 1*a* in which pipe 2 is a metal thin-walled cylindrical pipe 2*a* while flange 3 comprises resin, an elastic roller 1*a* in which pipe 2 is resin while flange 3 comprises metal, and an elastic roller 1*a* in which pipe 2 is a metal thin-walled cylindrical pipe 2*a* while flange 3 also comprises metal. Furthermore, by causing flanges 3 at the ends to be of different constitution, it will be possible to use this as an elastic roller 1*a* in which a gradient can be made to be present at a nip width capable of forming a gradient in the amount of deformation as a function of the shaft 8 direction under constant load.

FIG. 7 is an example comprising two, i.e., upper and lower, rollers 1. At (a) in FIG. 7, upper roller 1, which is a rigid roller 1*b* that has a rigid body, is a pressure-applying body 11. Lower roller 1 is an elastic roller 1*a* having elasticity in accordance with the present invention. (b) in FIG. 7 is a view of section H-H at (a) in FIG. 7 as seen from the direction indicated by the arrows, and with the axes of respective rollers 1 in a fixed mutual relationship, the central upper portion of lower elastic roller 1*a* deforms downward to form amount of deformation 12, which is to say that deformation of elastic roller 1*a* causes formation of nip width. Moreover, lower pipe 2 is formed from thin-walled cylindrical pipe 2*a*, either end 2*b* of the pipe being fitted to the outside at the periphery of flange 3.

FIG. 8 is an example comprising two, i.e., upper and lower, rollers 1. It so happens that this example is such that, at (a) in FIG. 8, upper roller 1 is an elastic roller 1*a* having elasticity in accordance with the present invention, and lower roller 1, which is a rigid roller 1*b* that has a rigid body, is a pressure-applying body 11. (b) in FIG. 8 is a view of section I-I at (a) in FIG. 8 as seen from the direction indicated by the arrows, and with the axes of respective rollers 1 in a fixed mutual relationship, the central lower portion of upper elastic roller 1*a* deforms upward, forming amount of deformation 12, which is to say that deformation of elastic roller 1*a* causes formation of nip width. Moreover, pipe 2 which forms upper elastic roller 1*a* is formed from thin-walled cylindrical pipe 2*a*, either end 2*b* of the pipe being fitted to the outside at the periphery of flange 3.

FIG. 9 is likewise an example comprising two, i.e., upper and lower, rollers 1. Unlike the examples of FIG. 7 and FIG. 8, this example is such that at (a) in FIG. 9 the two, i.e., upper and lower, respective rollers 1 are both formed from elastic rollers 1*a* having elasticity in accordance with the present invention. (b) in FIG. 9 is a view of section J-J at (a) in FIG. 9 as seen from the direction indicated by the arrows, and with the axes of respective rollers 1 in a fixed mutual relationship, the central lower portion of upper elastic roller 1*a* deforms upward, and the central upper portion of lower elastic roller 1*a* deforms downward, the combined deformation of both of these rollers 1, 1 together forming amount of deformation 12, which is to say that deformation of upper and lower elastic rollers 1*a*, 1*a* causes formation of nip width. Moreover, upper and lower pipes 2, 2 which form upper and lower elastic rollers 1*a*, 1*a* are formed from respective thin-walled cylindrical pipes 2*a*, either end 2*b* of each of the pipes being fitted to the outside at the periphery of flange 3.

FIG. 10 is drawing showing how the amount of indentation (amount of deflection) 12 corresponding to the reactive force as a function of load at elastic roller 1*a* having elasticity in accordance with the present invention might be measured by means of a tension meter (load gauge) 13. (a) in FIG. 10 shows a measurement apparatus, shaft 8 of roller 1 which is the target of investigation being mounted on and supported by support members 14 at roller mounting platform 15, pressure-applying body 11 being made to abut elastic roller 1*a* and cause it to be pressed downward by pressure P from tension meter 13 which is supported by means of a method that is not shown in the drawing above elastic roller 1*a* of roller 1, the amount of deformation (amount of deflection) 12 at the upper portion of elastic roller 1*a* constituting roller 1 which is displayed at tension meter 13 being read therefrom. (b) in FIG. 10 shows elastic roller 1*a* constituting roller 1 in the process of being measured, pressure-applying body 11 which presses thereon with pressure P from above, and the amount of deformation (amount of deflection) 12 at the top surface of elastic roller 1*a* constituting roller 1 as a result of its being pressed on.

As described above, as a result of employment of elastic roller(s) 1*a* having thin-walled cylindrical pipe(s) 2*a* in accordance with the present invention as shown in FIG. 7, FIG. 8, or FIG. 9, the fact that the axes of upper and lower rollers 1, 1 are maintained so that there is always a fixed mutual relationship of appropriate amount therebetween is made possible by elastic roller(s) 1*a* in accordance with the present invention alone. Accordingly, unlike rigid roller 1 comprising flanges 3 which are conventional rigid flanges 3*b* as shown in FIG. 4, elastic rollers 1*a* in accordance with the present invention as shown in FIG. 7, FIG. 8, and FIG. 9 are such that shaft-shaped bodies 9 or shaft 8 is/are supported by support members 14, the locations of these support members 14 are fixed relative to roller mounting platform 15, and the elastic roller 1*a* in accordance with the present invention is made to undergo elastic deformation, in which state there will be contact between upper and lower rollers 1, 1. This being the case, the amount of deformation (amount of deflection) 12 which is the width (nip width) of the region that is squeezed between upper and lower rollers 1, 1 will be constant. Accordingly, it will be possible to cause transport of thin print media, transport for cleaning of electronic parts comprising any of a plurality of board-like elastic bodies, and so forth to occur in stable fashion. In addition, because use of elastic roller 1*a* in accordance with the present invention will make it possible to achieve low-load pressure during contact, it will be possible to cause transport to occur in such fashion that scratches tend not to form on the surfaces of the item being transported. Furthermore, ordinary spring(s) may also be employed to cause elastic roller 1*a* in accordance with the present invention to undergo deformation.

Working Examples

Working examples of the present invention are described below. First, a tension meter (load gauge) 13, i.e., a commercially available HV-500NI-S, was used on the constitution of flange 3 at roller 1 in accordance with the present invention, the measured data for Working Example 1 and Working Example 2 being presented in TABLE 1.

TABLE 1

|  | Working Example 1 | Working Example 2 |
| --- | --- | --- |
| Flange constitution | Material: resin (POM)<br>Ring thickness $t_2$ = 0.5 mm<br>Rib spacing: 60°<br>Number of rings: 3<br>Flange lateral width: b = 4.5 mm | Material: resin (POM)<br>Ring thickness $t_2$ = 1.0 mm<br>Rib spacing: 60°<br>Number of rings: 3<br>Flange lateral width: b = 4.5 mm |
|  | Measured value / Calculated value | Measured value / Calculated value |
| Load when flange deformation was 0.1 mm | 37 g / 26 g | 152 g / 137 g |
| Load when flange deformation was 0.3 mm | 77 g / 77 g | 370 g / 410 g |
| Load when flange deformation was 0.5 mm | 124 g / 128 g | 565 g / 683 g |

As shown in TABLE 1, Working Example 1 was such that the constitution of roller 1 (i.e., flange 3) was such that the material of flange 3 comprised polyoxymethylene (POM) resin, this being constituted from three rings 4, thickness $t_2$ of each ring being 0.5 mm. Ribs 7 which provided mutual support between these rings 4 were arranged in annular fashion at a uniform spacing therebetween of 60°. The lateral width b of flange 3 being 4.5 mm, the measured value of the reactive-force-producing load was 37 g versus a calculated value of 26 g when the load was such as to cause the amount of deformation at this roller (i.e., amount of deformation at flange 3) to be 0.1 mm, the measured value of the reactive-force-producing load was 77 g versus a calculated value of 77 g when the load was such as to cause the amount of deformation at the roller (i.e., amount of deformation at flange 3) to be 0.3 mm, and the measured value of the reactive-force-producing load was 124 g versus a calculated value of 128 g when the load was such as to cause the amount of deformation at the roller (i.e., amount of deformation at flange 3) to be 0.5 mm.

Working Example 2 was such that the constitution of roller 1 (i.e., flange 3) was such that the material of flange 3 comprised polyoxymethylene (POM) resin, this being constituted from three rings 4, thickness $t_2$ at each ring being 1.0 mm. Ribs 7 which provided mutual support between these rings 4 were arranged in annular fashion at a uniform spacing therebetween of 60°. The lateral width b of flange 3 being 4.5 mm, the measured value of the reactive-force-producing load was 152 g versus a calculated value of 137 g when the load was such as to cause the amount of deformation at this roller (i.e., amount of deformation at flange 3) to be 0.1 mm, the measured value of the reactive-force-producing load was 370 g versus a calculated value of 410 g when the load was such as to cause the amount of deformation at the roller (i.e., amount of deformation at flange 3) to be 0.3 mm, and the measured value of the reactive-force-producing load was 565 g versus a calculated value of 683 g when the load was such as to cause the amount of deformation at the roller (i.e., amount of deformation at flange 3) to be 0.5 mm.

Moreover, conventional rigid flange 3*b* employed in conventional rigid roller 1*b* was such that when pipe 2 was supported thereby the hardness thereof was such that there was no occurrence of elastic deformation. In contradistinction thereto, flange 3 in accordance with the present invention was such that when pipe 2 was supported thereby it was found that flange 3 was capable of elastic deformation, and that it could be made to deform at low load.

At TABLE 1, respective thicknesses $t_2$ of the three rings 4 were made to be 0.5 mm as indicated for Working Example 1, and respective thicknesses $t_2$ of the three rings 4 were made to be 1.0 mm as indicated for Working Example 2, it being found when respective thicknesses t of the rings 4 were varied that different reactive-force-producing loads could be obtained as indicated at TABLE 1 for identical amounts of deformation (amounts of deflection) 12 at flange 3.

As indicated above at Working Example 1 and Working Example 2 in TABLE 1, because measured values of reactive-force-producing load and values calculated based on mechanical principles therefor were more or less close approximations of each other, it is possible to perform mechanical calculations for the load as a function of the amount of deformation of the flange, making it possible to determine the necessary amount of deformation and load based on calculations.

TABLE 2 indicates Working Example 3 and Working Example 4 for which reactive-force-producing load at flange 3 was measured as a function of the amount of deformation of a roller (i.e., flange 3) when flanges 3 indicated at TABLE 1 were made to engage with either end 2*b* of an elastically deformable pipe made of resin to obtain an elastic roller 1a having flanges 3. Note that measurement of the reactive-force-producing load of the roller (i.e., flange) as a function of the amount of deformation of the roller was carried out using the tension meter measurement method shown in FIG. 10.

respective thicknesses $t_2$ of the rings 4 at flange 3 were 1.0 mm Moreover, comparing the situation at Working Example 3 in which load was such as to cause the amount of deformation at the roller (i.e., amount of deformation at flange 3) to be 0.5 mm, it was found that the measured value of the reactive-force-producing load at the elastic roller of

TABLE 2

| | Elastic roller | | | |
|---|---|---|---|---|
| | Working Example 3 (Elastic roller 1a) | Working Example 4 (Elastic roller 1a) | Comparative Example 1 (Rubber roller 1c) | Comparative Example 2 (Rubber roller 1c) |
| Roller diameter | φ 35 | φ 35 | φ 35 | φ 35 |
| Roller constitution | Pipe 2 | Pipe 2 | Metal core: SUS φ 25 | Metal core: SUS φ 25 |
| | Pipe material: PC | Pipe material: PC | Rubber hardness 30 (JIS-A) | Rubber hardness 10 (JIS-A) |
| | Pipe wall thickness $t_1$ = 5 mm Flange 3 Ring thickness: $t_2$ = 0.5 mm Rib spacing: 60° Flange lateral width b = 4.5 mm | Pipe wall thickness $t_1$ = 5 mm Flange 3 Ring thickness: $t_2$ = 1.0 mm Rib spacing: 60° Flange lateral width b = 4.5 mm | Pipe rubber thickness t = 0.5 mm | Pipe rubber thickness t = 0.5 mm |
| Elastic modulus of pipe 2: E (Kg/mm²) | 245 | 245 | | |
| Pipe 2 L × $(t_2)^3$: (mm⁴) | 6.88 | 6.88 | | |
| Elastic modulus of flange 3: $E_2$ (Kg/mm²) | 287 | 287 | | |
| L × $(t_2)^3$: (mm⁴) at ring portion of flange | 0.56 | 4.50 | | |
| $E_1 \times L \times (t_1)^3$ | 1685.6 | 1685.6 | | |
| $E_2 \times b \times (t_2)^3$ | 160.7 | 1291.5 | | |
| | Measured value of reactive-force-producing load | Measured value of reactive-force-producing load | Calculated value of reactive-force-producing load | Calculated value of reactive-force-producing load |
| Load when roller deformation was 0.1 mm | 72 g | 130 g | 800 g | 300 g |
| Load when roller deformation was 0.3 mm | 330 g | 660 g | 6900 g | 2500 g |
| Load when roller deformation was 0.5 mm | 590 g | 1400 g | 19000 g | 6800 g |

As indicated at TABLE 2, comparing the situation at Working Example 3 in which load was such as to cause the amount of deformation at the roller (i.e., amount of deformation at flange 3) to be 0.1 mm, it was found that the measured value of the reactive-force-producing load at the elastic roller of Working Example 3 was 72 g when respective thicknesses $t_2$ of the rings 4 at flange 3 were 0.5 mm; and comparing the situation at Working Example 4 in which load was such as to cause the amount of deformation at the roller (i.e., amount of deformation at flange 3) to be 0.1 mm, it was found that the measured value of the reactive-force-producing load at the elastic roller of Working Example 4 was 130 g when respective thicknesses $t_2$ of the rings 4 at flange 3 were 1.0 mm Moreover, comparing the situation at Working Example 3 in which load was such as to cause the amount of deformation at the roller (i.e., amount of deformation at flange 3) to be 0.3 mm, it was found that the measured value of the reactive-force-producing load at the elastic roller of Working Example 3 was 330 g when respective thicknesses $t_2$ of the rings 4 at flange 3 were 0.5 mm; and comparing the situation at Working Example 4 in which load was such as to cause the amount of deformation at the roller (i.e., amount of deformation at flange 3) to be 0.3 mm, it was found that the measured value of the reactive-force-producing load at the elastic roller of Working Example 4 was 660 g when Working Example 3 was 590 g when respective thicknesses t of the rings 4 at flange 3 were 0.5 mm; and comparing the situation at Working Example 4 in which load was such as to cause the amount of deformation at the roller (i.e., amount of deformation at flange 3) to be 0.5 mm, it was found that the measured value of the reactive-force-producing load at the elastic roller of Working Example 4 was 1400 g when respective thicknesses t of the rings 4 at flange 3 were 1.0 mm Furthermore, regarding the relationship between pipe 2 and flange 3, by calculating this using 245 (Kg/mm²) as Young's modulus of the polycarbonate that was the material of pipe 2 it is found as indicated by the inequality that the value is higher for the pipe, under which conditions deformation was found to occur.

Note where it is indicated at Working Examples 3 and 4 in TABLE 2 that the pipe material is PC, this refers to polycarbonate plastic.

Moreover, TABLE 2 shows theoretical calculations for rubber roller 1c at Comparative Example 1 and Comparative Example 2. Here, Comparative Example 1 (rubber roller 1c) at TABLE 2 employs rubber of hardness 30 (JIS-A hardness) at the surface of a metal core, rubber roller 1c being covered by a rubber thickness t of 0.5 mm; and comparing the situation at Comparative Example 1 in which load is such as to cause the amount of deformation at the roller to be 0.1 mm, it can be seen that the calculated value for the reactive-force-producing load at rubber roller 1c of Comparative Example 1 is 800 g. On the other hand, Comparative Example 2 (rubber roller 1c) at TABLE 2 employs rubber of hardness 10 (JIS-A hardness) at the surface of a metal core, rubber roller 1c being covered by a rubber thickness t of 0.5 mm; and comparing the situation at Comparative Example 2 in which load is such as to cause the amount of deformation at the roller to be 0.1 mm, it can be seen that the calculated value for the reactive-force-producing load at rubber roller 1c of Comparative Example 2 is 300 g. Moreover, comparing the situation in Comparative Example 1 (rubber roller 1c) at TABLE 2 in which load is such as to cause the amount of deformation at the roller to be 0.3 mm, it can be seen that the calculated value for the reactive-force-producing load at rubber roller 1c of Comparative Example 1 is 6900 g. On the other hand, comparing the situation in Comparative Example 2 (rubber roller 1c) at TABLE 2 in which load is such as to cause the amount of deformation at the roller to be 0.3 mm, it can be seen that the calculated value for the reactive-force-producing load at rubber roller 1c of Comparative Example 2 is 2500 g. Moreover, comparing the situation in Comparative Example 1 (rubber roller 1c) at TABLE 2 in which load is such as to cause the amount of deformation at the roller to be 0.5 mm, it can be seen that the calculated value for the reactive-force-producing load at rubber roller 1c of Comparative Example 1 is 19000 g. On the other hand, comparing the situation in Comparative Example 2 (rubber roller 1c) at TABLE 2 in which load is such as to cause the amount of deformation at the roller to be 0.5 mm, it can be seen that the calculated value for the reactive-force-producing load at rubber roller 1c of Comparative Example 2 is 6800 g.

Thus, as compared with conventional rubber rollers, elastic rollers 1a in accordance with the present invention as indicated at Working Example 3 and Working Example 4 were such that the rollers could be made to deform at low load. Accordingly, it is possible to achieve an elastic roller 1a that was not conventionally available. Moreover, while elastic rollers 1a at these Working Examples 3 and 4 were such that flanges 3 comprised resin, and thin-walled cylindrical pipes 2a which constituted rollers 1 comprised resin, these may also be formed from metal having a modulus of elasticity different from that of resin.

As described above, by causing elastically deformable flanges 3 to engage with elastically deformable pipe 2 to form roller 1, it is possible to manufacture an elastic roller 1a that was not conventionally available, and it is possible to achieve a lightweight elastic roller 1a that was not conventionally available. Moreover, because elastic roller 1a in accordance with the present invention is such that elastically deformable flanges 3 can be formed from resin, it is possible to manufacture an elastic roller 1a that permits improvement in productivity, that is low in cost, and that is conservative of resources.

For example, roller 1 employed where elastic deformation was required might conventionally have been such that it was covered with an adequate thickness of rubber, and if employed where precision at the outside diameter was required, might have been such that the rubber with which it was covered was ground to obtain rubber roller 1c. In contrast, roller 1 in accordance with the present invention is such that, where employed at a location where heat is not generated, it may be formed from a molded resin part, and it is capable of undergoing elastic deformation and of doing so at low load; on the other hand, where employed at a location where heat is generated, it may be formed from heat-resistant resin or it may be formed from metal, and it will be capable of undergoing elastic deformation.

Moreover, when employed where it is required that there be a high coefficient of friction at the surface of roller 1 in accordance with the present invention, the surface of roller 1 might be coated with urethane or other such material having a high coefficient of friction; or where it is required that the surface of roller 1 have an irregular surface, a roller 1 employing a pipe 2 having grooves at the surface thereof formed by means of extrusion molding or pultrusion molding might be employed, or the surface of roller 1 might be covered with a cylindrical knit fabric or cylindrical woven fabric having a high coefficient of friction. Moreover, where it is required that the surface of roller 1 in accordance with the present invention have a finely patterned irregular surface, the surface of pipe 2 might be subjected to shot/sand blasting; or where it is required that the surface of roller 1 in accordance with the present invention have electrical conductivity, it will be possible by causing the material of pipe 2 to be a material having electrical conductivity to obtain an elastic roller 1a having electrical conductivity.

Furthermore, as applications for elastic rollers 1a in accordance with the present invention, they may be employed in many and diverse applications such as: as a pickup roller in a feed unit that carries out feeding of sheets by a roller 1 that has been imparted with gripping characteristics with respect to the sheets, transport rollers in a unit that carries out transport of sheets in the nip formed therebetween, a develop roller having electrical conductivity and surface roughness in a develop unit employed in an electrophotographic apparatus, an electrically conductive transfer roller employed in a transfer unit that carries out transfer of developer in an electrophotographic apparatus, a fuser roller in a fuser unit, a decurling roller that corrects the curl of sheets, a roller for a laminator that carries out lamination of film or the like, a platen roller in an apparatus employing a thermal head, and so forth.

For example, in the case of feed rollers and pickup rollers employed in feed units, because the purpose is to transport sheets or the like, it being required that the surface of roller 1 have a high coefficient of friction, a rubber roller 1c possessing elasticity and having a high coefficient of friction had conventionally been employed, but with elastic roller 1a in accordance with the present invention, by causing the surface of thin-walled cylindrical pipe 2a to be coated with a material that will increase the coefficient of friction thereat, it is also possible to obtain an elastic roller 1a which is such that the roller undergoes deformation and has a property by which it is able to accomplish gripping.

In the case of transport rollers employed in transport units, devices comprising a pair of rollers 1, 1 are commonly employed, spring members being used to achieve the nip pressure between rollers 1, 1 that allows transport to be carried out, but by using an elastic roller 1a in accordance with the present invention, it will be possible to cause there to be a fixed mutual relationship between shafts 8, 8 of such elastic rollers 1a, and it will be possible to cause transport to occur at low nip load, thus making it possible to reduce the parts count of the apparatus.

In the case of develop rollers employed in develop units in electrophotographic apparatuses, with respect to rollers that carry out contact develop, these have conventionally ordinarily been of the type in which a metal roller is covered with electrically conductive rubber, a roller having elasticity and electrical conductivity having been required. However, by using an elastic roller 1a in accordance with the present invention, by causing thin-walled cylindrical pipe 2a of elastic roller 1a in accordance with the present invention to be formed so as to have a surface roughness such as will permit transport of developer, and by employing a thin-walled cylindrical pipe 2a having electrical conductivity, it will be possible for this to be employed as a roller which is capable of elastic deformation at low load, and which experiences less load when used with developer, without the need to employ a thick electrically conductive rubber covering.

In the case of transfer rollers employed in transfer units in electrophotographic apparatuses, conventional transfer rollers have ordinarily been of the type in which a metal roller is covered with electrically conductive sponge or electrically conductive rubber, a roller constituted so as to have elasticity and permit attainment of adequate nip width having been required. However, by using an elastic roller 1a in accordance with the present invention, by causing thin-walled cylindrical pipe 2a of elastic roller 1a in accordance with the present invention to be formed from electrically conductive pipe 2, it will be possible for this to be employed as a transfer roller which is capable of elastic deformation, which will permit attainment of adequate nip width, and which will permit attainment of adequate transfer time, without the need to employ a thick electrically conductive rubber covering.

Moreover, in the case of fuser rollers, because adequate fusing time is required for carrying out fusing, it is necessary that a nip of adequate width be formed between rollers 1, 1. Conventionally, to obtain a nip of adequate width, it was necessary to use an adequate amount of low-hardness rubber in a thick layer to form a nip of adequate width, and it was moreover necessary to employ high loads to achieve the required nip width. However, by employing an elastic roller 1a in accordance with the present invention that is formed from heat-resistant material(s), it will be possible to achieve adequate nip width at low loads.

Furthermore, while not shown in the drawings, by causing the surface of elastic roller 1a in accordance with the present invention to be covered with a covering in the form of woven/knit fabric, this will make it possible for the steps and/or gaps intrinsically present in such woven/knit fabrics to be formed at the surface of elastic roller 1a in accordance with the present invention, making it possible to achieve a roller 1 which is such that contamination at the surface of the roller can be reduced when it is used for a long period of time.

In addition, while not shown in the drawings, by carrying out extrusion molding or pultrusion molding, grooves can easily be formed at the surface of pipe 2, and a treatment employing a coating can easily be applied to the surface of this pipe 2, making it possible to form a grooved roller which possesses elasticity.

INDUSTRIAL UTILITY

As described above, elastic rollers 1a in accordance with the present invention may be employed as rollers 1 in many and diverse applications, it being possible, for example, for these to be used in a wide variety of devices and facilities including the aforementioned pickup roller of a feed unit, transport rollers in a unit that carries out transport of sheets in the nip formed therebetween, develop roller having electrical conductivity and surface roughness in a develop unit employed in an electrophotographic apparatus, an electrically conductive transfer roller employed in a transfer unit that carries out transfer of developer in an electrophotographic apparatus, a fuser roller in a fuser unit, a decurling roller that corrects the curl of sheets, a roller for a laminator of film or the like, a platen roller in an apparatus employing a thermal head, and so forth.

EXPLANATION OF REFERENCE NUMERALS

1 Roller
1a Elastic roller
1b Rigid roller
1c Rubber roller
2 Pipe
2a Thin-walled cylindrical pipe
2b Ends of pipe
3 Flange
3a Central portion of flange
3b Conventional rigid flange
3c Cap
4 Ring
4a Outermost ring
4b Middle ring
4c Innermost ring
5 Shaft-receiving part
5a Shaft-receiving equivalent body
6 Annular gap
6a Outside gap
6b Intermediate gap
6c Inside gap
7 Rib
7a Outside rib
7b Intermediate rib
7c Inside rib
8 Shaft
8a Axis
9 Shaft-shaped body
9a Back face of shaft-shaped body
9b Section of shaft-shaped body
10 Hole through which shaft passes
11 Pressure-applying body
12 Amount of deformation
13 Tension meter (load gauge)
14 Support member
15 Roller mounting platform
b Lateral width of flange (width in shaft direction of ring)
t Rubber thickness
$t_1$ Wall thickness (of pipe)
$t_2$ Ring thickness
l Pipe length
l Length of portion of ring (beam) between ribs
E Modulus of elasticity
$E_1$ Elastic modulus of material of pipe
$E_2$ Elastic modulus of material of flange
I Second moment of area
$I_1$ Second moment of area of pipe
$I_2$ Second moment of area of ring of flange
P Load (pressure)
ρ Radius of curvature

The invention claimed is:
1. An elastic roller, comprising:
a cylindrical pipe and a plurality of flanges:
wherein the cylindrical pipe is a thin-walled cylindrical pipe formed of an elastically deformable material;
wherein the cylindrical pipe defines a central longitudinal axis located at a center of the diameter of the cylindrical pipe;
wherein the plurality of flanges are formed of an elastically deformable material;

wherein the elastically deformable material of the cylindrical pipe and the plurality of flanges is capable of deforming in order to produce a reactive-force-producing load and exhibits a reactive-force-producing elasticity when a load is applied to the cylindrical pipe along the central longitudinal axis;

wherein the flanges present at the are located at either of two ends of the cylindrical pipe;

wherein each of the plurality of flanges has a plurality of annular rings of differing diameters that are located peripheral to the central longitudinal axis;

wherein each of the plurality of flanges comprises a plurality of ribs arranged so as to be perpendicular to the annular rings;

wherein the ribs are provided such that the ribs are uniformly spaced around the annular rings and are located in annular gaps between the annular rings, among these annular rings of differing diameters, which are a small-diameter ring and a large-diameter ring located adjacent to the small-diameter ring;

wherein the flanges are integrally formed such that they comprise the plurality of ribs and annular rings of differing diameters; and the two ends of walled cylindrical pipe engage with and are captured by outside circumferences of outermost annular rings of the flanges; and wherein the cylindrical pipe and the flanges are capable of undergoing elastic deformation in the same direction, relative to the central longitudinal axis of the cylindrical pipe, when a load is applied to the cylindrical pipe.

2. The elastic roller according to claim 1, further comprising:

a hole located at a center of each of the plurality of flanges; and a shaft that extends through the hole of at least one of the plurality of flanges and supports the elastic roller or shaft-shaped bodies that extend through the hole of at least one of the plurality of flanges and support the elastic roller;

wherein the shaft or shaft-shaped bodies extend beyond an exterior surface of at least one of the plurality of flanges.

3. The elastic roller according to claim 1, further comprising:

a hole located at a center of each of the plurality of flanges; and a shaft that extends through the hole of at least one of the plurality of flanges and supports the elastic roller or shaft-shaped bodies that extend through the hole of at least one of the plurality of flanges and support the elastic roller;

wherein the shaft or shaft-shaped bodies extend beyond an exterior surface of at least one of the plurality of flanges; and wherein the plurality of flanges is molded from resin material.

4. The elastic roller according to claim 1, further comprising:

a hole located at a center of each of the plurality of flanges; and a shaft that extends through the hole of at least one of the plurality of flanges and supports the elastic roller or shaft-shaped bodies that extend through the hole of at least one of the plurality of flanges and support the elastic roller;

wherein the shaft or shaft-shaped bodies extend beyond an exterior surface of at least one of the plurality of flanges;

wherein the cylindrical pipe exhibits a Young's modulus $E_1$ and a second moment of inertia $I_1$;

wherein the plurality of flanges exhibits a Young's modulus $E_2$ and a second moment of inertia $I_2$, and wherein the values of $E_1$, $I_1$, $E_2$, and $I_2$ satisfy at least one of the following inequalities:

$$E_1 \times I_1 \geq E_2 \times I_2 \text{ or } E_1 \times L \times (t_1)^3 \geq E_2 \times b \times (t_2)^3$$

wherein the length of the pipe is L, the wall thickness of the pipe is $t_1$, the width in a shaft direction of the annular rings of the flanges is b, and the thickness of the annular rings of the flanges is $t_2$.

5. The elastic roller according to claim 1, further comprising:

a coating that comprises at least one of silicone, urethane, and PTFE.

6. The elastic roller according to claim 1, wherein the elastic roller is covered by woven or knit fabric.

7. The elastic roller according to claim 1, characterized in that wherein the cylindrical pipe comprises an electrically conductive material.

* * * * *